United States Patent
You et al.

(10) Patent No.: US 8,964,978 B2
(45) Date of Patent: Feb. 24, 2015

(54) METHOD AND APPARATUS FOR EFFICIENTLY FIXING TRANSFORMED PART OF CONTENT

(71) Applicant: Samsung Electronics Co., Ltd., Gyeonggi-do (KR)

(72) Inventors: Yong-kuk You, Suwon-si (KR); Hyun-kwon Chung, Suwon-si (KR); Jun-bum Shin, Suwon-si (KR); Yun-ho Choi, Suwon-si (KR); Su-hyun Nam, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/849,914

(22) Filed: Mar. 25, 2013

(65) Prior Publication Data

US 2013/0219509 A1   Aug. 22, 2013

Related U.S. Application Data

(63) Continuation of application No. 11/488,692, filed on Jul. 19, 2006, now Pat. No. 8,428,256.

(60) Provisional application No. 60/700,336, filed on Jul. 19, 2005, provisional application No. 60/701,493, filed on Jul. 22, 2005, provisional application No. 60/703,003, filed on Jul. 28, 2005.

(30) Foreign Application Priority Data

Jul. 12, 2006   (KR) ........................ 10-2006-0065179

(51) Int. Cl.
*G06F 21/00* (2013.01)
*G06F 21/10* (2013.01)
*G11B 20/00* (2006.01)

(52) U.S. Cl.
CPC .......... *G06F 21/10* (2013.01); *G11B 20/00427* (2013.01)
USPC ............. 380/201; 380/217; 380/239; 726/13; 726/26; 709/229; 709/247; 713/153; 713/193; 455/515

(58) Field of Classification Search
USPC ............................................ 726/26; 380/201
See application file for complete search history.

(56) References Cited

U.S. PATENT DOCUMENTS 5,689,559 A   11/1997   Park
6,167,513 A   12/2000   Inoue et al.
(Continued)

FOREIGN PATENT DOCUMENTS

CN   1183841 A   6/1998
CN   1262770 A   8/2000
(Continued)

OTHER PUBLICATIONS

Communication dated Sep. 10, 2013, issued by the Japanese Patent Office in corresponding Application No. 2012-172593.
(Continued)

*Primary Examiner* — Morshed Mehedi
(74) *Attorney, Agent, or Firm* — Sughrue Mion, PLLC (57) ABSTRACT

Provided are a method and apparatus for effectively fixing scrambled content. The method includes checking fixing information for a program map table (PMT) packet of packets constituting the content, the fixing information being used to fix a transformed part of the content; extracting location information of a next PMT packet containing fixing data for fixing the transformed part of the content from the fixing information of the PMT packet; and fixing the transformed part of the content by using the fixing data in the next PMT packet indicated by the extracted location information. Accordingly, it is possible to easily detect a location of the content, which stores the fixing information, thereby expediting fixing of the transformed content.

4 Claims, 5 Drawing Sheets

(56) References Cited

U.S. PATENT DOCUMENTS

| | | | |
|---|---|---|---|
| 6,285,774 B1 | 9/2001 | Schumann et al. | |
| 6,463,153 B1 | 10/2002 | Sako et al. | |
| 7,016,951 B1 | 3/2006 | Longworth et al. | |
| 7,127,619 B2 | 10/2006 | Unger et al. | |
| 7,239,709 B1 | 7/2007 | Yamada et al. | |
| 7,391,866 B2 | 6/2008 | Fukami et al. | |
| 2001/0008575 A1 | 7/2001 | Rho et al. | |
| 2002/0168082 A1* | 11/2002 | Razdan | 382/100 |
| 2003/0026423 A1* | 2/2003 | Unger et al. | 380/217 |
| 2003/0095664 A1 | 5/2003 | Asano et al. | |
| 2003/0112974 A1* | 6/2003 | Levy | 380/210 |
| 2003/0142560 A1 | 7/2003 | Terao et al. | |
| 2004/0073916 A1* | 4/2004 | Petrovic et al. | 725/18 |
| 2004/0133794 A1 | 7/2004 | Kocher et al. | |
| 2004/0240668 A1 | 12/2004 | Bonan et al. | |
| 2005/0031308 A1 | 2/2005 | Fu et al. | |
| 2005/0119052 A1* | 6/2005 | Russell et al. | 463/42 |
| 2005/0193205 A1* | 9/2005 | Jacobs et al. | 713/176 |
| 2005/0204037 A1* | 9/2005 | Levy | 709/225 |
| 2005/0251683 A1* | 11/2005 | Levy et al. | 713/176 |
| 2006/0009247 A1 | 1/2006 | Kelley et al. | |
| 2006/0150251 A1 | 7/2006 | Takashima et al. | |
| 2007/0038861 A1 | 2/2007 | Weber et al. | |
| 2011/0275388 A1* | 11/2011 | Haney | 455/456.3 |
| 2014/0230010 A1 | 8/2014 | Ginter et al. | |

FOREIGN PATENT DOCUMENTS

| | | |
|---|---|---|
| CN | 1423274 A | 6/2003 |
| EP | 0 730 274 B1 | 5/2002 |
| EP | 1524659 A1 | 4/2005 |
| JP | 2002-518899 A | 6/2002 |
| JP | 2007-525729 A | 9/2007 |
| KR | 10-0475199 B1 | 5/2005 |
| WO | 2004-097828 A2 | 11/2004 |

OTHER PUBLICATIONS

Becker, M. et al., "A Study of the DVD Content Scrambling System (CSS) Algorithm", IEEE, 2004, p. 353-356.

Arnaud be Bossoreille de Ribou, "pmt.h", http://www.videolan.org/developers/libdvbpsi/doc/doxygen/html/pmt_8h-source.html, 2002.

European Office Action issued Jun. 4, 2010, in counterpart European Application No. 06117438.9.

Wen et al., A Format-Compliant Configurable Encryption Framework for Access Control of Video, IEEE Transactions Oncircuits and Systems for Video Technology, vol. 12, No. 6, Jun. 2002.

Beallare et al. "Authenticated Encryption in SSH: Provably Fixing the SSH Binary Packet Protocol", An extended abstract of this paper appears in Ninth ACM Conference on Computer and Communications Security, ACM, 2002.

Anonymous: Blu-Ray Disc Founders, "White paper Blu-ray Disc Format, 1.B Physical Format Specifications for BD-R", US, Aug. 2004, pp. 1-33, XP002324152.

Jiangtao Wen; Michael Severa; Wenjun Zeng; Maximilian H. Luttrell; Weiyin Jin, "A Format-compliant configurable encryption framework for access control of video", In: Circuits and Systems for Video Technology, IEEE Transactions on, vol. 12, Issue 6, Jun. 2002, pp. 545-557.

Wenjun Zeng; Jiangtao Wen; Michael Severa, "Fast self-synchronous content scrambling by spatially shuffling codewords of compressed bitstreams", In: Image Processing. 2002. Proceedings. 2002 International Conference on, vol. 3, Jun. 24-28, 2002, pp. III-169-III-172 vol. 3.

Communication dated Dec. 17, 2007 from the Korean Intellectual Property Office in a counterpart application No. 10-2006-0065179.

Communication from the European Patent Office issued Feb. 14, 2012 in counterpart European Application No. 10184500.6.

Communication from the European Patent Office issued Feb. 14, 2012 in counterpart European Application No. 10184517.0.

Communication dated Dec. 1, 2014 issued by the State Intellectual Property Office of the People's Republic of China in counterpart Chinese Patent Application No. 201210052808.5.

* cited by examiner

FIG. 6 ional Application No. 60/703,003, filed on Jul. 28, 2005, the disclosures of which are incorporated herein in their entirety by reference.

METHOD AND APPARATUS FOR EFFICIENTLY FIXING TRANSFORMED PART OF CONTENT

CROSS-REFERENCE TO RELATED PATENT APPLICATION

This is a Continuation Application of U.S. application Ser. No. 11/488,692 filed on Jul. 19, 2006, which claims priority from Korean Patent Application No. 10-2006-0065179, filed on Jul. 12, 2006 in the Korean Intellectual Property Office, and the benefit of U.S. Provisional Application No. 60/700,336, filed on Jul. 19, 2005, U.S. Provisional Application No. 60/701,493, filed on Jul. 22, 2005, and U.S. Provisional Application No. 60/703,003, filed on Jul. 28, 2005, the disclosures of which are incorporated herein in their entirety by reference.

BACKGROUND OF THE INVENTION

1. Field of the Invention

Methods and apparatuses consistent with the present invention relate to restoring content, and more particularly, an aspect of the invention relates to a method and apparatus for effectively fixing up a transform part of content.

2. Description of the Related Art

The standard for the AACS (Advanced Access Content System), which is a next-generation optical disc protection system, uses a broadcast encryption scheme that does not allow a player having a device key set revoked due to hacking and so on to decrypt content encrypted according to the broadcast encryption scheme. In the broadcast encryption scheme, a different device key set is allocated to each player, and an intermediate key encrypted using a revoked device key set is not stored in discs that are distributed to the public, thereby preventing a player having the revoked device key set from acquiring the intermediate key. Thus, the player having the revoked device key set cannot obtain a content decryption key.

However, even if a device key set is not disclosed, hacking software may be created based on structural flaws of a specific player model. In this case, a large number of players may be hacked by the hacking software, and thus, it is impossible to revoke all device key sets allocated to the hacked players in order to cope with this situation.

To solve this problem, an individual content renewability scheme has been introduced to control restoration of content by using programmable code for each content. In the renewability scheme, security code controlling restoration of content is stored in a disc. The security code is executed before reproduction of the content so as to determine whether there are problems in reproducing the content. For instance, it is determined whether a device key set of the player has been disclosed or whether hacking software is installed or is running. Then, the content is restored only when it is determined that there is no problem in the content reproduction process. In other words, it is difficult to upgrade an already sold player, but a disc can be upgraded at a content level by storing the security code thereon.

Figure 1:
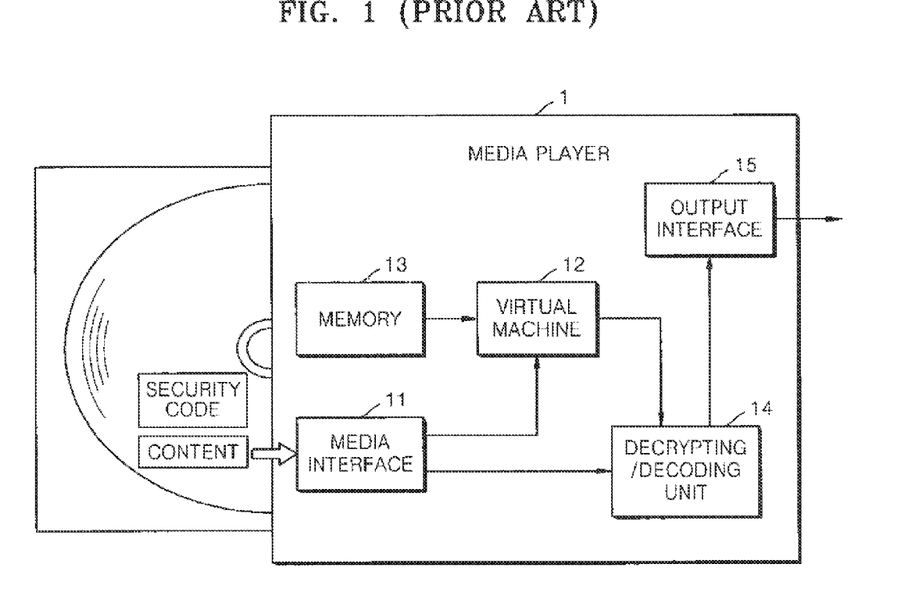
FIG. 1 is a block diagram illustrating a conventional media player.

FIG. 1 is a block diagram of a conventional media player 1. Referring to FIG. 1, the conventional media player 1 includes a media interface 11, a virtual machine 12, a memory 13, a decrypting/decoding unit 14, and an output interface 15.

The media interface 11 reads content and security code, which is a program protecting the content, from a medium, such as a digital video disk (DVD) and a compact disk (CD).

The virtual machine 12 executes the security code read by the media interface 11 to generate information of the media player 1, and compares the generated information with information of the media player 1 which has been stored in the memory 13. Next, the virtual machine 12 determines whether a device key set of the media player 1 has been disclosed or hacking software thereof is installed or is running based on the comparison result, and further executes the security code to generate information for controlling content restoration only when it is determined that the device key set of the media player 1 has not been disclosed or the hacking software thereof is not installed or is not running.

The decrypting/decoding unit 14 decrypts and decodes the content, which is read by the media interface 11, by using the information generated by the virtual machine 12. If the content is encrypted according to content protection standards, such as the CSS standards or the AACS standards, the decrypting/decoding unit 14 decrypts the content read by the media interface 11 according to the content protection standards used to encrypt the content. If the content is coded according to the MPEG-2 standards, the content is decoded according to the MPEG-2 standards.

The output interface 15 outputs the content, which was decrypted and decoded by the decrypting/decoding unit 14, to a display device, such as a digital Television (DTV).

As described above, a conventional, individual content renewability scheme provides a solution to control content restoration according to whether a device key set of a media player has been disclosed or whether a security environment for the media player is normal. However, the conventional, individual content renewability scheme does not provide a solution to protect content against frequent attacks of a hacker throughout content reproduction, for example.

SUMMARY OF THE INVENTION

An aspect of the present invention provides an apparatus and method for effectively fixing content that is transformed to be protected against frequent attacks of a hacker throughout content reproduction.

An aspect of the present invention also provides a computer readable medium having recorded thereon a computer program for executing the above method.

According to an aspect of the present invention, there is provided a method of fixing content, the method including checking fixing information for a first packet of packets constituting the content, the fixing information being used to fix a transformed part of the content; extracting location information of a second packet of the packets from the fixing information of the checked first packet, the second packet containing fixing data for fixing the transformed part of the content; and fixing the transformed part of the content by using the fixing data in the second packet indicated by the extracted location information.

According to another aspect of the present invention, there is provided a computer readable medium having recorded thereon a computer program for executing the above method.

According to another aspect of the present invention, there is provided an apparatus for fixing content, the apparatus including a checking unit which checks fixing information for a first packet of packets constituting the content, and which extracts location information of a second packet of the packets from the checked fixing information, where the fixing information is used to fix a transformed part of the content and the second packet contains fixing data for fixing the transformed part of the content; and a fixing unit which selectively fixes the transformed part of the content based on the fixing information of the first packet checked by the checking unit.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, exemplary embodiments according to the present invention will be described in detail with reference to the accompanying drawings.

Figure 2:
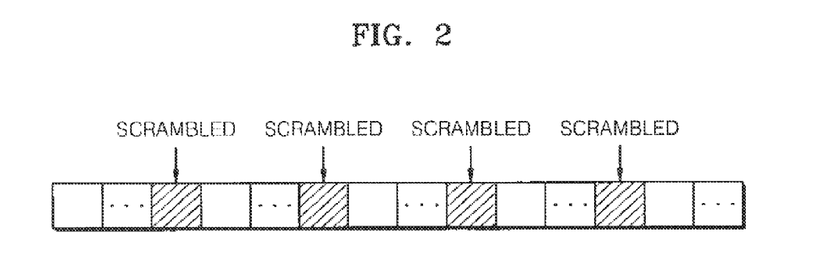
FIG. 2 is a diagram illustrating a content protection method according to an embodiment of the present invention.

FIG. 2 is a diagram illustrating a content protection method according to an exemplary embodiment of the present invention.

As described above, the conventional, individual content renewability scheme does not provide a solution to protect content against frequency attacks of a hacker throughout content reproduction, for example. Thus, region code of a digital video disk (DVD), for example, is likely to be easily deactivated merely by using a simple operation of a remote control. In particular, when content restoration is controlled by using a small number of simple control commands, the conventional, individual content renewability scheme may be deactivated with only a few attacks during a beginning state of content reproduction. To prevent this problem, according to an embodiment of the present invention, content is scrambled to be transformed, and plural pieces of information needed to descramble the scrambled content are independent from one another, and security code is designed to contain the plural pieces of the information. Thus, the security code is continuously used to descramble the scrambled content.

However, scrambling the entire content may increase the load on the system depending on the specification of the system. Accordingly, according to an embodiment of the present invention, some separated parts of the content are scrambled to transform the content as illustrated in FIG. 2, thereby sufficiently preventing a user from viewing the content. Parts of content transformed by scrambling may be fixed by using various methods. First, various information needed to fix the transformed parts of the content is contained in security code. In this case, since a large amount of data is contained in the security code, the load on the system is significantly increased in an environment that requires the security code to be continuously executed to reproduce the content.

Second, a part of the information needed to fix a transformed part of content is contained in security code and the majority of the information is contained in the content. In this case, it is important to easily determine which part of the content stores the information for fixing the transformed part of the content. Thus, in an embodiment of the present invention, information for fixing a transformed part of content is stored in a reserved region of a program map table (PMT) packet according to the Moving Picture Experts Group (MPEG)-2. However, it would be apparent to those of ordinary skilled in the art that types of packets, other than the PMT packet, may be used to store the information.

Third, a flag is inserted into a PMT packet that contains information for substantially fixing a transformed part of content in order to distinguish the PMT packet from general packets. However, in this case, all packets must be parsed to detect the PMT packet containing the information for fixing the transformed part of the content. To solve this problem, in an embodiment of the present invention, location information of a next PMT packet containing information for fixing a transformed part of content is inserted into a PMT packet.

Figure 3:
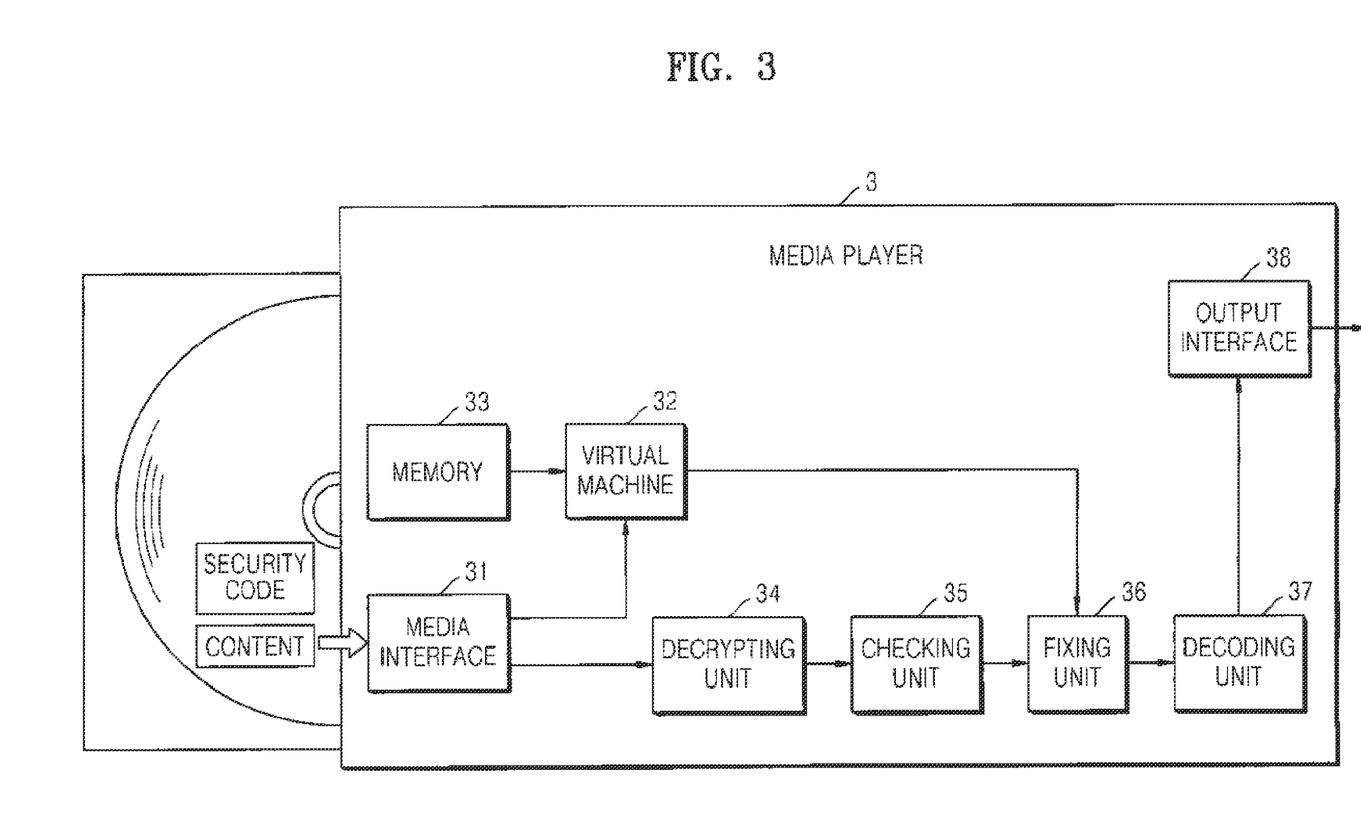
FIG. 3 is a block diagram of a media player according to an embodiment of the present invention.

FIG. 3 is a block diagram of a media player 3 according to an exemplary embodiment of the present invention. Referring to FIG. 3, the media player 3 includes a media interface 31, a virtual machine 32, a memory 33, a decrypting unit 34, a checking unit 35, a fixing unit 36, a decoding unit 37, and an output interface 38.

The media interface 31 reads content and security code, which is a program for protecting the content, from a medium, such as a DVD or a compact disk (CD). Also, the media interface 31 may support temporarily storing of the content to match a decrypting speed of the decrypting unit 34 or a decoding speed of the decoding unit 37.

In an embodiment of the present invention, a representative example of content is an audio visual (AV) title coded according to the MPEG-2 standard. Also, content may be protected according to various methods. For example, content may be encrypted by using a content scramble system (CSS) key according to the CSS standard or using a title key according to the advanced access content system (AACS) standard. Otherwise, according to an exemplary embodiment of the present invention, content may be transformed by scrambling separated parts thereof.

The virtual machine 32 executes the security code read by the media interface 31 to generate information of the media player 3, and compares information of the media player 3 stored in the memory 33 with the generated information of the media player 3 in security code. Next, the virtual machine 32 determines whether a device key set of the media player 3 has been disclosed or hacking software thereof is installed or is running, based on the comparison result, and further executes the security code to generate information for fixing a transformed part of the content (hereinafter referred to as "fixing information") only when it is determined that the device key set of the media player 3 has not been disclosed and hacking software thereof is not installed or is not running. For example, the virtual machine 32 may be embodied as a Java virtual machine, and the security code may be embodied as a Java program which is also referred to as Java byte code. The Java virtual machine interprets the Java byte code, and executes the interpreted code to be proper for a platform (Window, UNIX, McIntosh, etc.) into which the Java virtual machine is installed. It would be apparent to those of ordinary skilled in the art that the virtual machine 32 may be embodied in a programming language other than Java.

If content is transformed by scrambling separated parts thereof in an embodiment of the present invention, the fixing information may be descramble information for fixing the transformed part. In particular, according to an embodiment of the present invention, the fixing information may be obfuscated to prevent values of the fixing information from being easily interpreted. It would be apparent to those of ordinary skilled in the art that the term "obfuscating" may be replaced with other terms, such as "masking". Also, if content is transformed by scrambling separated parts thereof in an embodiment of the present invention, fixing information may contain location information indicating which part of the content is scrambled, and information regarding the size of a scrambled part of the content.

The decrypting unit 34 decrypts the content read by the media interface 31. If the content is encrypted by using a CSS key according to the CSS standard, the decrypting unit 34 decrypts the content by using the CSS key according to the CSS standard. If the content is encrypted by using a title key according to the AACS standard, the decrypting unit 34 encrypts the content by using the title key according to the AACS standard. If the content is not encrypted as described above, it would be apparent to those of ordinary skill in the art that the decrypting unit 34 may be omitted from the media player 3 according to an exemplary embodiment of the present invention.

The checking unit 35 checks fixing information for fixing the transformed part of the content for a PMT packet among packets that constitute the content decrypted by the decrypting unit 34, and extracts location information of a next PMT packet from the checked fixing information of the PMT packet, the next PMT packet containing data for substantially fixing the transformed part of the content (hereinafter referred to as "fixing data").

Also, the checking unit 35 extracts fixing data from the fixing information of the PMT packet when the fixing information contains the fixing data. However, fixing information contained in each PMT packet does not always contain fixing data but may contain only relative location information of a next PMT packet containing fixing data. In other words, fixing information contained in each PMT packet always contains location information of a next PMT packet containing fixing data but may not contain fixing data.

Instead, a PMT packet that does not contain fixing data may contain information for forensic marking. If fixing information of a PMT packet contains information for forensic marking, not fixing data, the checking unit 35 extracts the information for forensic marking from the fixing information of the PMT packet. Forensic marking is a method of expressing player information used for hacking when content has been hacked and distributed without permission. For example, according to forensic marking, player ID may be inserted into the content.

Figure 4:
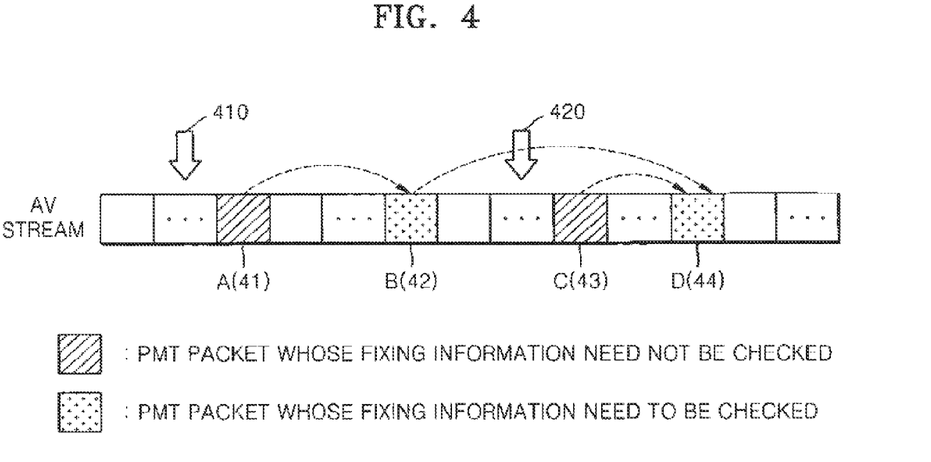
FIG. 4 is a diagram illustrating a process of checking fixing information according to an embodiment of the present invention.

FIG. 4 is a diagram illustrating a process of checking fixing information according to an embodiment of the present invention.

The media player 3 of FIG. 3 may reproduce content stored in a medium starting from either the head of the content or a middle part thereof, as a user selects. Thus, the checking unit 35 checks fixing information of a PMT packet first appearing from a starting point, which is selected by the user, from which the content is reproduced.

Referring to FIG. 4, the checking unit 35 skips checking fixing information of PMT packets present between a current PMT packet and a next PMT packet that contains fixing data, based on relative location information of a next PMT packet, and directly checks fixing information of the next PMT packet containing the fixing data. Here, the relative location information of the next PMT packet represents a relative packet number indicating a total number of packets between the current PMT packet and the next PMT packet that contains the fixing data. That is, the checking unit 35 checks fixing information of a next PMT packet present in a location corresponding to a value obtained by adding the number of the current PMT packet plus one to the relative packet number of the next PMT packet.

For example, if the starting point from which the content is reproduced is marked by a left arrow 410 of FIG. 4, the checking unit 35 checks fixing information of a PMT packet A (41) that first appears from the starting point. Next, the checking unit 35 extracts a relative packet number of a next PMT packet containing fixing data, i.e., a PMT packet B (42), from the fixing information of the PMT packet A (41), and checks fixing information of the PMT packet B (42) based on the extracted relative packet number. Next, the checking unit 35 extracts a relative packet number of a next PMT packet containing fixing data, i.e., a PMT packet D (44), from the fixing information of the PMT packet B (42), and checks fixing information of the PMT packet D (44) based on the extracted relative packet number. In this case, checking fixing information of a PMT packet C (43) is skipped, because the PMT packet C (43) does not contain fixing data.

If the starting point from which the content is reproduced is marked by a right arrow 420 of FIG. 4, the checking unit 35 checks the fixing information of the PMT packet C (43) first appearing from the starting point. Next, the checking unit 35 extracts a relative packet number of a next PMT packet containing fixing data, i.e., the PMT packet D (44), from the fixing information of the PMT packet C (43), and checks the fixing information of the PMT packet D (44) based on the extracted relative packet number. In this case, the fixing information of the PMT packet C (43) is checked, because the PMT packet C (43) first appears from the starting point from which the content is reproduced although the PMT packet C (43) does not contain fixing data.

That is, the checking unit 35 checks fixing information of a PMT packet first appearing from the starting point that the content begins to be reproduced, and then checks only fixing information of a PMT packet containing fixing data without checking information of all PMT packets.

The fixing unit 36 selectively fixes a transformed part of the content based on fixing information generated by the virtual machine 32 and fixing information of a PMT packet checked by the checking unit 35. More specifically, when the fixing information of the PMT packet checked by the checking unit 35 contains fixing data, the fixing unit 36 fixes the transformed part of the content by using the fixing data included in the fixing information of the PMT packet checked by the checking unit 35, i.e., the fixing data extracted by the checking unit 35.

However, when the fixing information of the PMT packet checked by the checking unit 35 contains information for forensic marking, not fixing data, the fixing unit 36 inserts the information for forensic marking into the content. When the fixing information of the PMT packet contains fixing data, separated, scrambled parts of the content are descrambled by using the fixing data. When the fixing information of the PMT packet contains the information for forensic marking, the information for forensic marking is inserted into the content.

The fixing unit 36 may use various methods for fixing the transformed part of the content. For example, the fixing information of the PMT packet checked by the checking unit 35 may include an obfuscated part. In this case, the fixing information generated by the virtual machine 32 is used to deobfuscate the obfuscated part of the fixing information of the PMT packet checked by the checking unit 35. That is, the fixing unit 36 deobfuscates the obfuscated part of the fixing information of the PMT packet checked by the checking unit 35 by using the fixing information generated by the virtual machine 32, and fixes the transformed part of the content by using the deobfuscated fixing information. The deobfuscating of the obfuscated part may be performed through an XOR operation. That is, fixing information may be deobfuscated by performing an XOR operation on the fixing information and a specific bit stream. In this case, the fixing information generated by the virtual machine 32 is the specific bit stream. That is, the fixing unit 36 restores the original fixing information by performing the XOR operation on the fixing information generated by the virtual machine 32, and fixing information contained in the fixing information of the PMT packet checked by the checking unit 35.

In an exemplary embodiment of the present invention, fixing information includes fixing data, information for forensic marking, location information of a next PMT packet that contains the fixing data, etc. The location information of the next PMT packet containing the fixing data may not be obfuscated. The location information of the next PMT packet containing the fixing data must always be checked regardless of whether or not the fixing information contains the fixing data, the information for forensic marking, etc., and therefore may not be obfuscated to be directly used without performing a deobfuscating process.

The decoding unit 37 restores the original content by decoding the content decrypted by the decrypting unit 34, the content fixed by the fixing unit 36, or the content into which the information for forensic marking has been inserted. If the content is encoded according to the MPEG-2 standard, the decoding unit 37 restores the original content by the content fixed by the fixing unit 36 according to the MPEG-2 standard.

The output interface 38 outputs the content decoded by the decoding unit 37 to a display device, such as a digital television (DTV).

Figure 5:
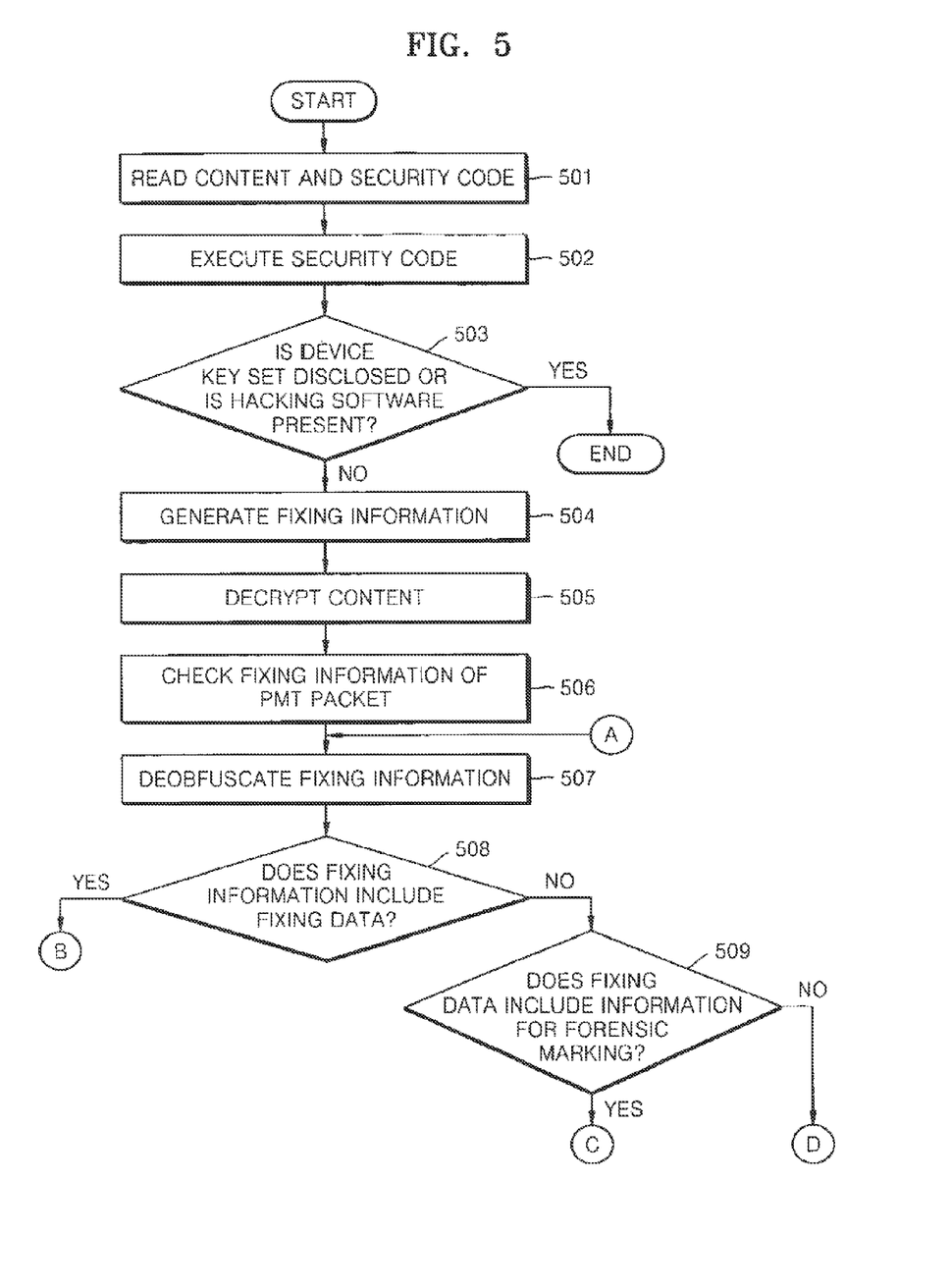
FIGS. 5 and 6 are flowcharts illustrating a method of restoring content according to an embodiment of the present invention.
Figure 6:
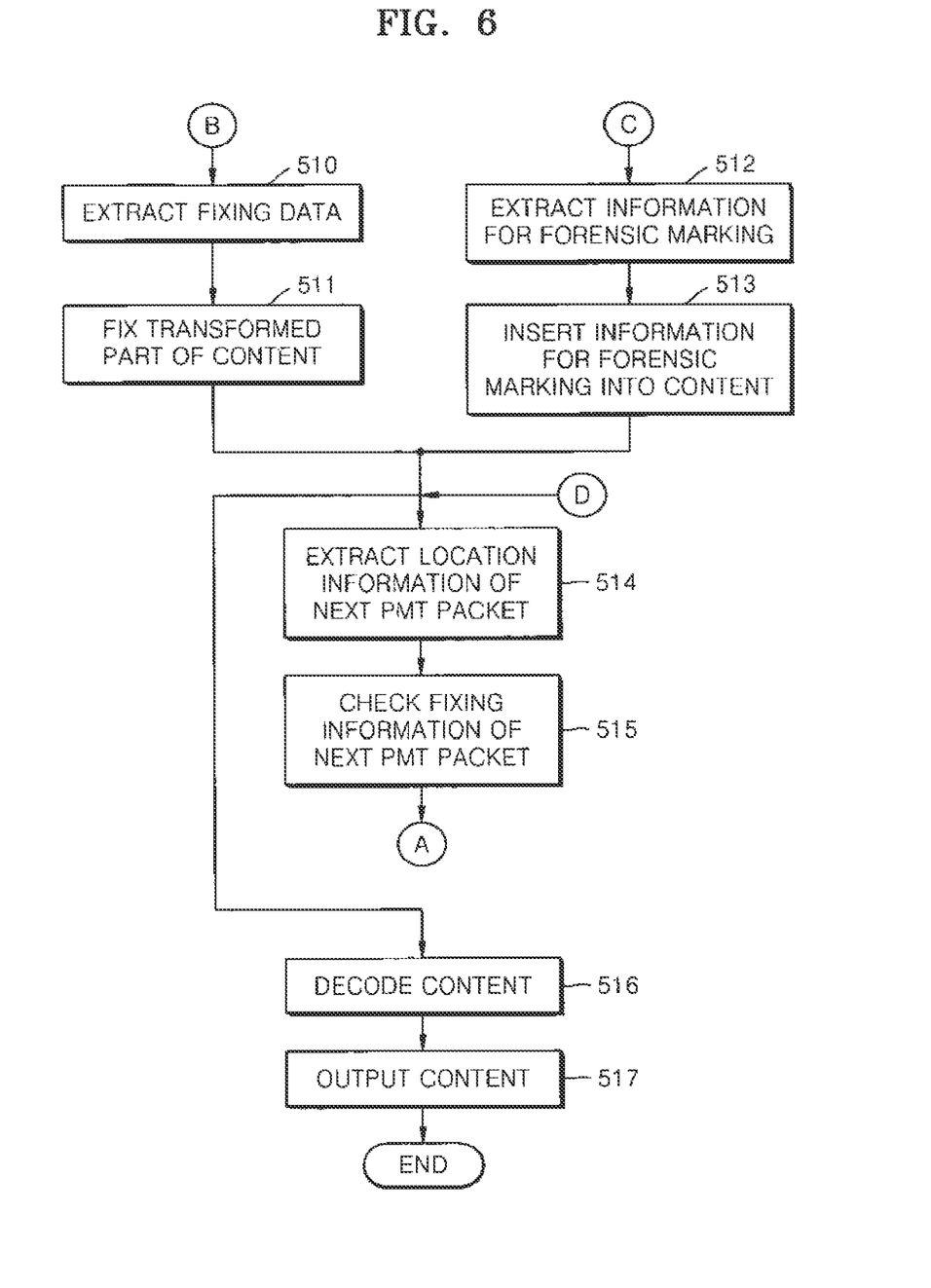

FIGS. 5 and 6 are flowcharts illustrating a method of restoring content according to an exemplary embodiment of the present invention. The method illustrated in FIGS. 5 and 6 includes timing operations performed by the media player 3 of FIG. 3. Thus, although not described here, the above operations of the media player 3 are also applicable to the method of FIGS. 5 and 6.

In operation 501, the media player 3 reads content and security code, which is a program for protecting the content, from a medium, such as a DVD or a CD.

In operation 502 the media player 3 executes the security code extracted in operation 501 to generate information of the media player 3, and compares the generated information of the media player 3 in security code with information of the media player 3 stored in the memory 33.

In operation 503, the media player 3 determines whether a device key set of the media player 3 has been disclosed or hacking software thereof is installed or is running, based on the comparison result in 502, and performs operation 504 when it is determined that the device key set of the media player 3 has not been disclosed or the hacking software thereof is not installed or is not running. When it is determined that the device key set has been disclosed or the hacking software thereof is installed or is running, the method is terminated.

In operation 504, the media player 3 further executes the security code to generate fixing information for fixing a transformed part of the content.

In operation 505, the media player 3 decrypts the content read in operation 501.

In operation 506, the media player 3 checks fixing information of a PMT packet of packets constituting the content decrypted in operation 505, the PMT packet first appearing as from a starting point, which is selected by a user, from which the content is reproduced.

In operation 507, the media player 3 deobfuscates the fixing information of the PMT packet checked in operation 506 by using the fixing information generated in operation 504. As described above, the location information of a next PMT packet containing fixing data may not be obfuscated.

In operation 508, the media player 3 performs operation 510 when the fixing information deobfuscated in operation 507 contains fixing data, and performs operation 509 otherwise.

In operation 509, the media player 3 performs operation 512 when the fixing information obfuscated in operation 507 contains information for forensic marking, and performs operation 514 otherwise.

In operation 510, the media player 3 extracts fixing data from the fixing information deobfuscated in operation 507.

In operation 511, the media player 3 fixes the transformed part of the content by using the fixing data extracted in operation 510.

In operation 512, the media player 3 extracts the information for forensic marking from the fixing information deobfuscated in operation 507.

In operation 513, the media player 3 inserts the information for forensic marking extracted in operation 512 into the content.

In operation 514, the media player 3 extracts location information of a next PMT packet that contains fixing data from the fixing information of the PMT packet checked in operation 506.

In operation 515, the media player 3 directly checks the fixing information of the next PMT packet extracted in operation 514 without checking fixing information of PMT packets present between a current PMT packet and the next PMT packet. Next, the media player 3 performs operation 507 to fix the transformed part of the content by using the fixing data in the next PMT packet indicated by the location information extracted in operation 513.

In operation 516, the media player 3 restores the original content by decoding the content decrypted in operation 505, the content fixed in operation 511 or the content into which the information for forensic marking was inserted in operation 513.

In operation 517, the media player 3 outputs the content decoded in operation 516 to an output device, such as a DTV.

The above embodiments of the present invention can be embodied as a computer program, and realized in a general digital computer via a computer readable medium. Also, data constructions used in the above embodiments can be recorded in a computer readable medium via various devices. Here, the computer readable medium may be a read-only memory (ROM), a random access memory (RAM), a compact disc (CD)-ROM, a magnetic tape, a floppy disk, an optical data storage device, and a carrier wave that transmits data via the Internet, for example.

According to an aspect of the present invention, information for fixing content that is transformed by scrambling separated parts thereof is stored in a PMT packet in order to easily detect the location of the information for fixing the content, thereby expediting fixing the transformed parts of the content. In particular, according to the present invention, each PMT packet contains location information of a next PMT packet including fixing data for substantially fixing a transformed part of the content, and thus, it is possible to directly check the fixing data without parsing all PMT packets.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of reproducing content which is provided in a plurality of packets, the method comprising:
   extracting from a first packet of the plurality of packets information regarding a location of a second packet containing forensic information which forensically marks the content;
   extracting the forensic information from the second packet present at the location; and
   inserting the extracted forensic information into the content.

2. The method of claim 1, wherein the packet is a program map table packet.

3. A non-transitory computer readable medium having recorded thereon a computer program for executing a method of reproducing content which is provided in a plurality of packets, the method comprising:
   extracting from a first packet of the plurality of packets information regarding a location of a second packet containing forensic information which forensically marks the content;
   extracting the forensic information from the second packet present at the location; and
   inserting the extracted forensic information into the content.

4. An apparatus for reproducing content which is provided in a plurality of packets, the apparatus comprising:
   a checking unit which extracts from a first packet of the plurality of packets information regarding a location of a second packet containing forensic information which forensically marks the content and extracts the forensic information from the second packet present at the location; and
   a fixing unit which inserts the extracted forensic information into the content.

* * * * *